UNITED STATES PATENT OFFICE.

GEORGE ARCHBOLD, OF OSWEGO, NEW YORK.

MANUFACTURE OF PAPER-PULP.

SPECIFICATION forming part of Reissued Letters Patent No. 10,828, dated May 22, 1883.

Original No. 274,250, dated March 20, 1883. Application for reissue filed April 25, 1883.

*To all whom it may concern:*

Be it known that I, GEORGE ARCHBOLD, of Oswego, in the county of Oswego and State of New York, have invented certain improvements particularly useful in the art of manufacturing paper-pulp, of which the following is a specification.

My invention relates to the treatment of wood, straw, rags, or any other suitable substance of a cellulose or fibrous nature for converting the same into paper-pulp; and it has for its object the complete separation of the gummy and resinous matters and tannin from the fiber, and the production of a paper-pulp of superior quality and in increased quantity from the aforesaid substances, by producing acid sulphite of lime in the structure, or in the fiber itself of the substance treated, whereby more efficient action of the salt is secured.

The peculiar force known "as catalytic action," as fully demonstrated by Liebig and others, operates in such a way that certain gases, when united with bases—such as hydrate of lime, for example—in the presence of moist porous or fibrous substances, increase reducing action, so that it is not only more complete, but the resulting salt produced is itself more powerful. I avail myself of this important principle in the manufacture of paper-pulp. Various methods have heretofore been devised for subjecting such substances to the action of sulphurous acid or its salts; but these, in a great measure, have been to treat the substance operated on by means of solutions of the sulphites, acid, or neutral salts. The imperfections attending such methods are that the reducing action is to a large extent lost. Therefore the resulting product is not so pure, and in quantity it is less than when produced by my method. Another disadvantage is that such ordinary methods cause corrosive action on the vessels used unless they are lined with lead, and little more than one-half of the proper reducing effects is obtained by such methods. I avoid these objections by my improved process and materially reduce the time and expense heretofore required to make paper-pulp of superior quality, and the following directions will enable those skilled in the art to avail themselves of my invention.

I cut the wood or other suitable substance into convenient pieces, so that chemicals may come quickly into intimate contact with and efficient action upon the fiber. Then fill an ordinary digester or other suitable apparatus about three-fourths full with the pieces. Then put in from any convenient part of the digester, by means of a pipe or an opening at the top, for example, dilute milk of lime, preferably at ordinary temperature, or 62° Fahrenheit, (but this temperature may be varied considerably,) until the wood or other substance is covered. The dilute milk of lime should contain from one to six per cent. of hydrated lime, the rest being water. The per cent. of lime will necessarily vary as stated, because of the varying nature of the fibrous substances to be treated. Thus, for example, straw is of less density than most woods, and a liquid containing one per cent. of lime would be suitable for its treatment. Hard woods, however, and those containing much resinous matter, will require the extreme proportion of lime, because more powerful action of the lime is required to speedily affect their structure. I then pass in from any convenient part of the digester, by any usual means, sulphurous-acid gas, preferably but not necessarily compressed. Sometimes the mixture will take more and sometimes less sulphurous-acid gas; but the proper quantity may be determined by the use of blue litmus-paper, as when the mixture will turn blue litmus-paper distinctly red enough gas has been introduced. In some cases when hard, dense wood is used, I use in the diluted milk of lime about one pound of nitrate of lime for every one hundred pounds of wood; but in ordinary cases this is not necessary. When the mixture gives a distinct acid reaction with blue litmus-paper, as aforesaid, there is produced between the fibers and in the fiber acid sulphite of lime with a slight trace of sulphate. This reaction causes partial disintegration of the wood or other substance, completely reduces the gummy and resinous bodies between the fibers, and produces a fibrous mass somewhat resembling what paper-makers term "half-stuff." Next I subject the mass to steam-pressure, preferably in the digester, by heating it or by admitting steam into it of four to five atmospheres (more or less) for one hour, more or less, both dependent on the nature of the wood or substance undergoing treatment, the harder and denser substances requiring the most time. Finally, I wash out the chemicals used with water, which leaves the product pure cellulose resembling cotton-wool.

If bleaching should be necessary, as it may be in case certain dark-colored substances are used, and it is desirable to make white paper, a good process is as follows, viz: Use for every hundred pounds of dry pulp three pounds of chloride of lime and one ounce of acid sulphate of alumina. Dissolve the acid sulphate of alumina in water and add it to the mixture of chloride of lime and water and mix with the pulp. These chemicals may be washed out afterward with water. The product obtained can be further handled by pulp or paper makers in the usual manner.

Having thus described my invention, what I claim to be new, and desire to secure by Letters Patent of the United States, is—

1. In the art of manufacturing paper-pulp, the process of disintegrating cellulose or other fibrous vegetable material herein described, which consists in producing the acid sulphite of lime in the structure of the substance treated by the chemical treatment employed, substantially as set forth.

2. The improvement in the art of manufacturing paper-pulp herein described, which consists in first cutting the vegetable substance to be treated into suitable pieces, then treating it with dilute milk of lime, then subjecting it to the action of sulphurous-acid gas, then subjecting it to steam-pressure, and then removing the chemicals used, substantially as hereinbefore set forth.

GEORGE ARCHBOLD.

Witnesses:
MARCUS S. HOPKINS,
HENRY L. HOWE.